April 28, 1936.　　P. NIEDORFF ET AL　　2,038,952
COMBINED SHOPPING BAG AND PURSE
Filed Nov. 30, 1934　　2 Sheets-Sheet 1
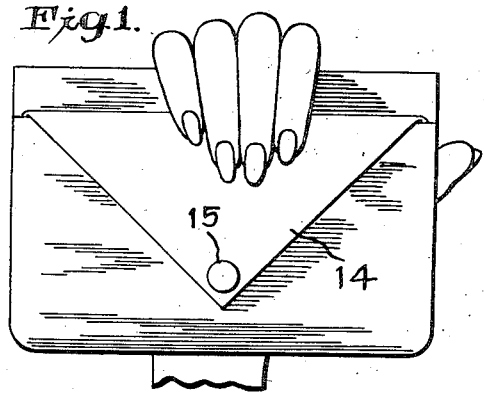
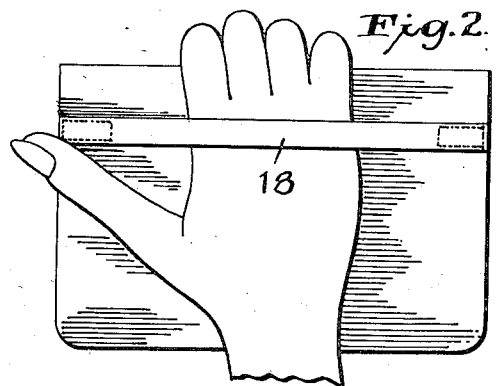
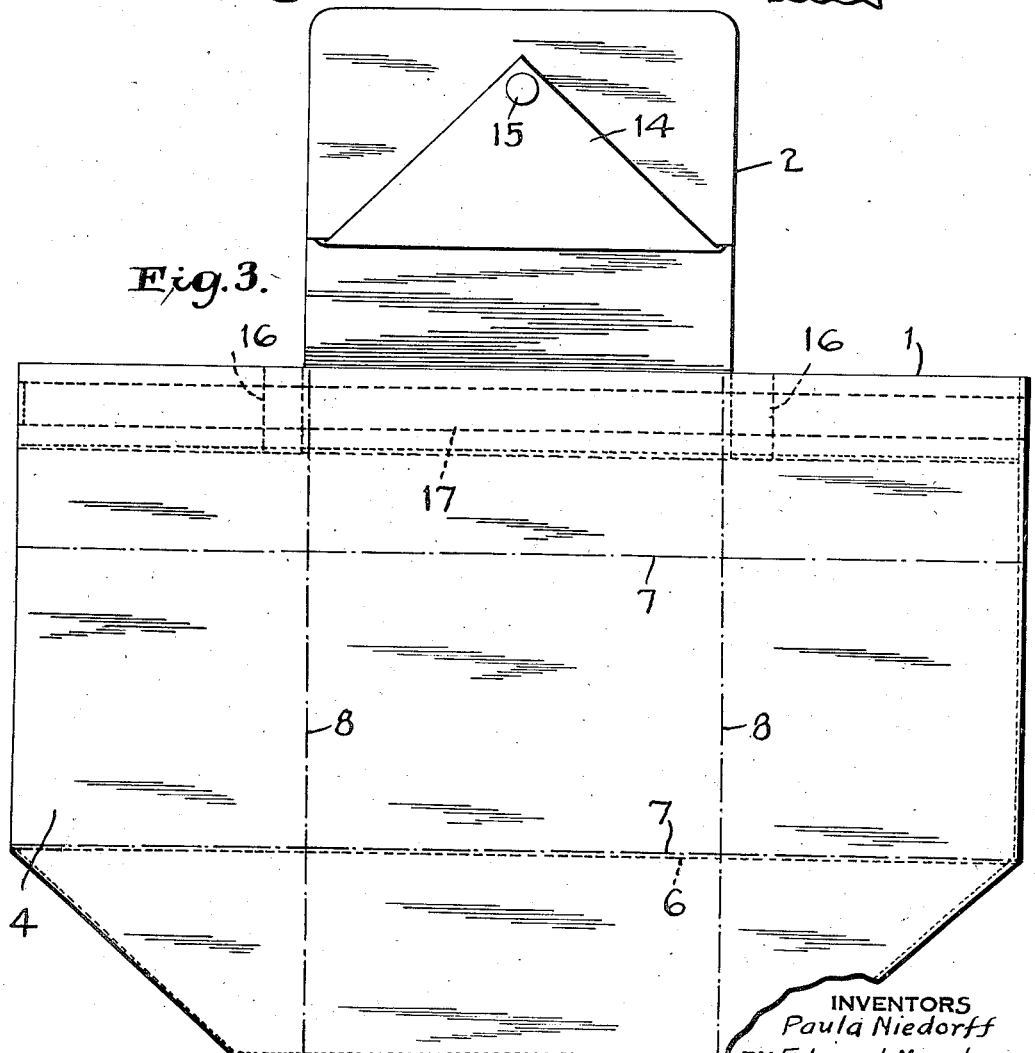
INVENTORS
Paula Niedorff
BY Edward Manolesco
ATTORNEY April 28, 1936.  P. NIEDORFF ET AL  2,038,952
COMBINED SHOPPING BAG AND PURSE
Filed Nov. 30, 1934  2 Sheets-Sheet 2
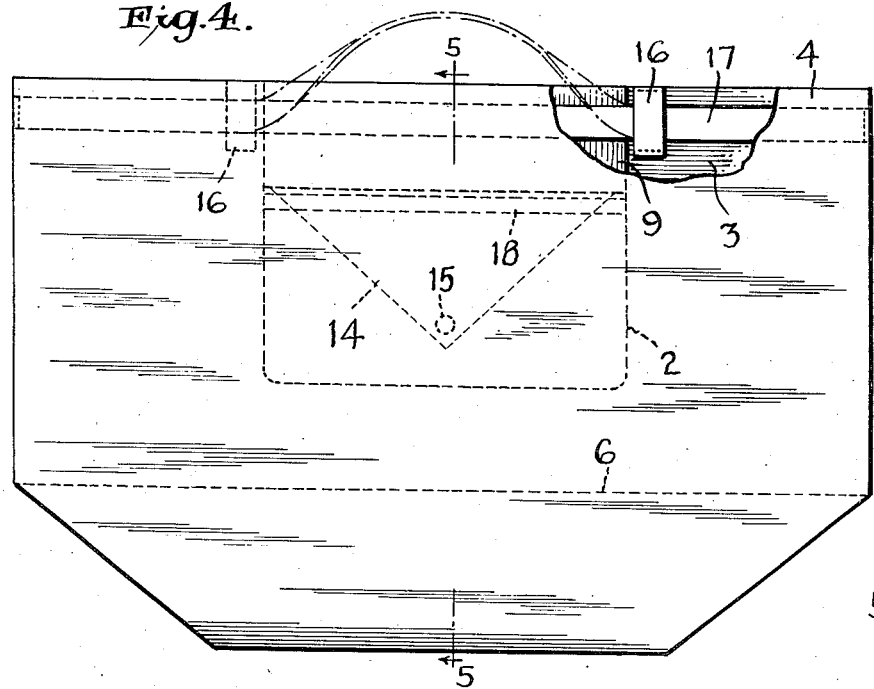
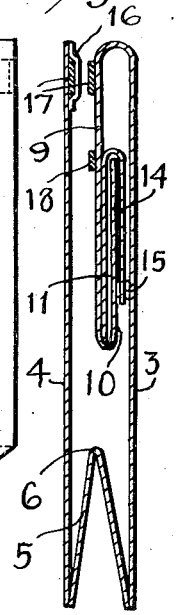
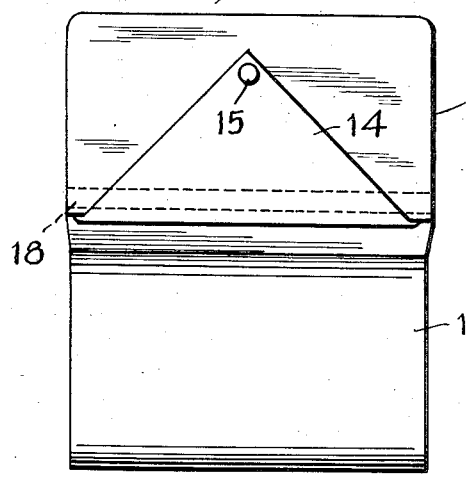
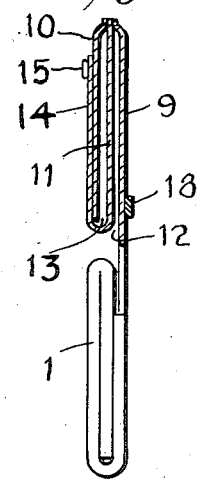
INVENTORS
Paula Niedorff
BY Edward Manolesco
ATTORNEY Patented Apr. 28, 1936

2,038,952

UNITED STATES PATENT OFFICE 2,038,952

COMBINED SHOPPING BAG AND PURSE

Paula Niedorff and Edward Manolesco, New York, N. Y.; said Manolesco assignor to said Niedorff Application November 30, 1934, Serial No. 755,380

6 Claims. (Cl. 150—1.7)

This invention has reference to the art of carriers for small articles, and particularly relates to a combination shopping bag and purse.

It is an object of our invention to construct a lightweight, strong, durable and economically produced shopping bag and purse, the parts being so combined as to provide a maximum of safety for articles carried in the various pockets or compartments; it is also an object of our invention to provide a plurality of carriers which will be economical to construct, and the parts of which will fold into small compass so as to enable it to be readily and conveniently carried in one's hand; to provide a combination shopping bag and purse or pocketbook in which articles of various size can be readily deposited and carried while shopping, and not interfere with the handling of the purse or monies contained therein, and in which both money and articles may be safely disposed in crowded stores and other places of congestion; to construct a shopping bag and purse or pocketbook in such form as to enable the one to be inserted in and carried by the other, regardless of whether the shopping bag feature is in use or the pocketbook or purse feature is in use; to provide a combination shopping bag and pocketbook of such form and construction that it may be made of light silks, satin, linen or other textile fabrics so as to enable it to be carried without embarrassment because of size or appearance, and also to enable the shopping bag member of comparatively large size to be neatly and compactly folded so that it may be inserted in the pocketbook or purse member, thus disguising the characteristics of both members; and to provide a combination article such as outlined in the foregoing with a number of new features adapting it for the purposes noted and uses intended;

With the foregoing objects in view and others which will be detailed during the course of this description, our invention consists in the parts, features, elements and combinations of the same hereinafter described and claimed.

In order that our invention may be clearly understood, we have provided drawings wherein:

Figure 1 is a front elevational view of our combination article showing the shopping bag portion folded into the compass of the purse, and indicating the manner in which the four fingers of the hand of a person may be bent over the mouth of one of the pockets to safely hold all the articles in the purse;

Figure 2 is a rear elevational view of Figure 1 showing how the hand is passed under the holding strap on the back of the purse;

Figure 3 is a plan view of the combination bag and purse extended preparatory to utilizing the article as a shopping bag or folding the bag within the purse, the lower portion of the figure being broken away due to the limitations of the sheet;

Figure 4 is a plan view, with parts broken away, showing the article in use as a shopping bag and indicating the safety measures provided for holding the purse during shopping;

Figure 5 is a view in vertical section on the line 5—5 of Figure 4;

Figure 6 is a plan view showing how the various parts of the shopping bag are folded preparatory to inserting the same within the pocket of the purse provided therefor; and Figure 7 is a view in sectional elevation of Figure 6, the purse part being in section and the bag being in elevation.

In the drawings, it will be noted that the shopping bag member 1 is considerably larger than the purse or pocketbook member 2, Figures 3 and 6, and it will be seen that the shopping bag can be folded into small compass and inserted in a pocket of the purse or pocketbook; and that when the shopping bag is in use the purse or pocketbook is inserted within the shopping bag. Thus, in both instances, the articles carried are safely disposed, and fear of filching therefrom is entirely eliminated.

Referring to Figures 3, 4 and 5, the numeral 3 indicates one side of the receptacle called "shopping bag", 4 being the opposite side thereof, both these parts being similar and of uniform size. At the bottom, the body members 3 and 4 are narrowed and between the same a bottom member 5 is inserted. This bottom member is in the form of an attenuated hexagon, is creased longitudinally, as at 6, so as to fold against the members 3 and 4, and is attached along its edges to the said members so as to form an extensible bottom when the bag has articles placed therein. At other times, or normally, the bottom 5 is folded inwardly at 6 between the members 3 and 4. This bottom member may be made of a single piece of material, or it may be made of several pieces; and the body members 3 and 4 may likewise be made in one piece folded centrally or of several pieces seamed together.

The body members are creased both transversely, as at 7, and vertically, as at 8, Figure 3, so as to facilitate folding the bag into the compass of the purse, Figure 6, into which latter the body or shopping bag may be inserted, as shown in Figures 1 and 2. The purse is formed in extension of the body member 3, and is composed of two outer members 9 and 10 and an intermediate partition member 11, thus forming two pockets 12 and 13, into one of which the shopping bag portion 1 may be inserted when the said bag is folded along the crease lines above indicated. The partition of the purse is extended beyond the outer member 10 and at its outer edge is formed with a V-shaped flat 14, and at the vertex of the angle is provided with a snap fastener member, the male member of which is secured to the body of the purse so that, when the flap is folded over the pocket 13, the members of the fastener will cooperate to hold the flap in position, as shown at 15.

The mouth of the shopping bag may be hemmed for strength and to prevent distortion; but, with certain materials this will not be necessary. Transversely of the hem or adjacent the mouth of the bag, there are applied several loops 16 adapted to hold an endless tape or a pair of tapes 17, secured at their opposite ends to the sides of the bag within the mouth opening thereof. These loops hold the tapes normally in position adjacent the mouth opening of the bag, and said tapes between the loops are adapted to act as handles so that the bag can be carried and partially closed during shopping, as shown by the dot and dash lines, Figure 4. At this time, the purse is folded on the mouth line of the bag and is drawn under the adjacent handle tape and allowed to depend within the bag. Consequently, the heavier the weight carried by the bag, the tighter the mouth of the bag will be closed.

When the shopping bag is to be folded within the purse, and the latter utilized as such, the bottom member is either folded within the outside portions of the bag between the two members 3 and 4 thereof, or a portion of the bottom member is folded over along the bottom crease line 7 upon the member 4 of the bag. In either of these positions, the bag member is readily folded on the vertical crease lines 8, so as to overlap the side portions, and then the bag and the folds thereof are again folded transversely on the crease lines 7, thus bringing the entire folded portion within the outline of the purse at its ends and adjacent the large open pocket 12 thereof. The bag member is then folded or tucked into the large pocket 12 of the purse, leaving a space for one's handkerchief and other soft articles, and exposing the flap 14 of the other pocket 13 with its fastener 15, in which pocket 13 the change purse may be carried, folded money bills may be inserted, and the entire article supported by one hand and held safely, as in Figures 1 and 2. That is to say, a strap 18 is provided extending longitudinally of the purse on its side opposite the flap 14, which is securely stitched in position and under which the hand of the user may be inserted, so that the four fingers may be bent over the mouth opening of the pocket 12 and the flap 14 firmly compressed, thus preventing any possibility of loss of the contents of either of the pockets, or loss of the purse and bag as a whole. This is an important feature of our invention. When one desires to go shopping or purchases articles which it is desired to carry unexposed, the shopping bag may be drawn out of the pocket, shaken, and allowed to unfold, as shown in Figures 4 to 7, inclusive, whereupon the purse member 2 is passed under one of the handle tapes and allowed to depend within the bag member, as clearly shown.

From the foregoing, it will be seen that we have provided a combination shopping bag and purse having all the attributes and characteristics suggested in the foregoing, and which has the important feature of safety in shopping, safety in handling, and a complete guard against the loss of money contained in the purse or any other article contained either in the purse or in the bag; and these important characteristic features are contained in an article of large capacity and small compass.

Within the scope of our invention, the body members 3 and 4 of the shopping bag may be made integral or in one piece, or in two pieces, and this is also true of the bottom 5 of the bag which may be not only seamed to the members 3 and 4 at their bottom, but may also be seamed along the length of the fold 6. The purse may also be formed as an integral extension of the member 3 of the bag, or be made separately therefrom and seamed thereto. In other words, it is within the scope of our invention to make the parts of the bag in as many or in as few pieces as may be desired.

Having thus described my invention what I claim and desire to secure by Letters Patent is:

1. In combination with a foldable shopping bag made of flexible material, a purse attached thereto and having a pocket adapted to receive the bag when the parts of the latter are folded into small compass so as to be inserted within the said purse pocket.

2. In combination with a foldable shopping bag made of flexible material, a purse formed integral with the bag and in extension of the same at the mouth thereof, said purse having two pockets, one of which is normally open, and an overfoldable flap for closing the other pocket, the normally open pocket being adapted to receive and hold the bag when folded into small compass, and a hand strap secured to the purse on the outside thereof adjacent the normally open pocket, whereby the hand of the user can be slipped under the said strap when the bag is inserted into the normally open purse pocket and the fingers of the user can be closed over the normally open pocket and compressed upon the flap of the other pocket.

3. A combination shopping bag and purse composed of foldable flexible material, the purse being comparatively small and formed as an extension of the bag at the mouth thereof, handle tapes secured to the opposite sides of the mouth opening of the bag and concealed within the latter, and the purse being foldable into the mouth of the bag and under one of the handles to confine the purse and conceal it within the bag.

4. As an article of manufacture, a combined shopping bag and purse consisting of a large foldable bag member and a comparatively small purse member, the latter being formed in extension of the bag member at the mouth of the latter, and said purse having a plurality of pockets on opposite sides thereof, both of which pockets are located beyond the mouth of the bag and one of which is adapted to receive and contain the bag member when folded into small compass, substantially as described.

5. A combined shopping bag and purse composed of flexible material, and the purse being formed with a pocket and in extension of the body portion of the bag, the bag being creased in several directions whereby the bag portion may be folded into small compass and inserted within the purse pocket, or the purse portion may be folded within the bag, substantially as described.

6. A combined shopping bag and purse formed of flexible material and the bag being considerably larger than the purse, and the latter being provided with a pocket and being formed in extension of the body portion of the bag at the mouth of the latter, and the bag being creased in several directions whereby the purse may be folded into and protected by the bag portion, and the bag portion may be folded and inserted in the purse portion, substantially as described.

PAULA NIEDORFF.
EDWARD MANOLESCO.